Figure 1:
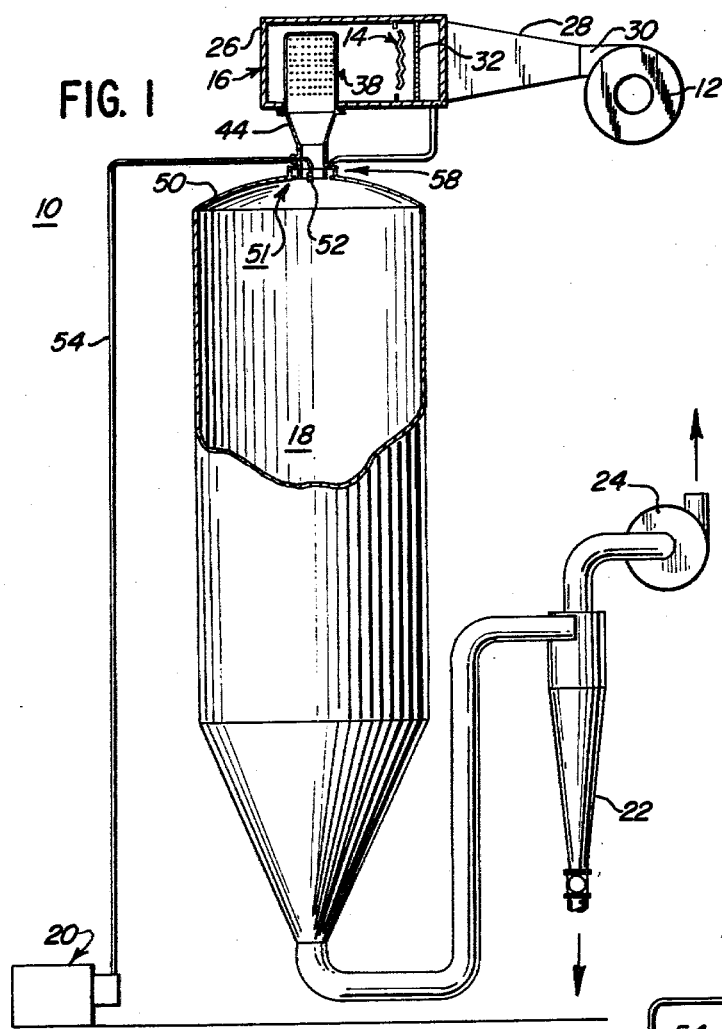

United States Patent [19]

Becker, Jr. et al.

[11] 4,187,617
[45] Feb. 12, 1980

[54] SPRAY DRYER

[76] Inventors: James J. Becker, Jr., 1205 S. 1st St., Stillwater, Minn. 55082; Henry T. Beresford, 2243 E. Larpenteur Ave., Apt. 115, Maplewood, Minn. 55109

[21] Appl. No.: 970,654

[22] Filed: Dec. 18, 1978

[51] Int. Cl.$^2$ .............................................. F26B 17/10
[52] U.S. Cl. .................... 34/57 R; 34/57 A; 159/4 A; 432/58
[58] Field of Search .................... 34/57 R, 57 A, 168; 159/4 R, 4 A, 16 R; 432/58, 222

[56] References Cited

U.S. PATENT DOCUMENTS

| 3,731,393 | 5/1973 | Okada et al. | 34/57 R |
| 4,020,564 | 5/1977 | Bayliss | 34/57 R |

*Primary Examiner*—Larry I. Schwartz
*Attorney, Agent, or Firm*—Allegretti, Newitt, Witcoff & McAndrews

[57] ABSTRACT

The improved spray dryer of the present invention is designed to be utilized to transform a liquid feed solution into a dry powder. The spray dryer comprises: an air supply fan which supplies the continuous flow of air required for drying at a relatively high velocity; an air heater which heats the flow of drying air to a desired, relatively high temperature; a drying chamber which receives dispersed, small droplets of the feed solution and wherein the droplets are transformed into dry particles; a novel air distribution system that directs the flow of drying air into the drying chamber so that air flowing into the drying chamber has relatively uniform temperature and velocity profiles; an atomizing system which forms and introduces the dispersed droplets of feed solution in the flow of drying air; and a powder recovery system which collects the particles dried in the drying chamber and which removes the air from the spray dryer. The novel air distribution system includes: sloped transition ducting interconnecting the air supply fan and the air distribution system; a pre-profile plate upstream of the air heater; a profile plate to prevent large quantities of drying air from bypassing the heater; a diffuser; a compression device, although in some disclosed embodiments, the diffuser constitutes a part of this device; a downstream drying air distributor; nozzle taper structure for the nozzle portion of the atomizing system; and an internal air gap cooling system.

12 Claims, 8 Drawing Figures

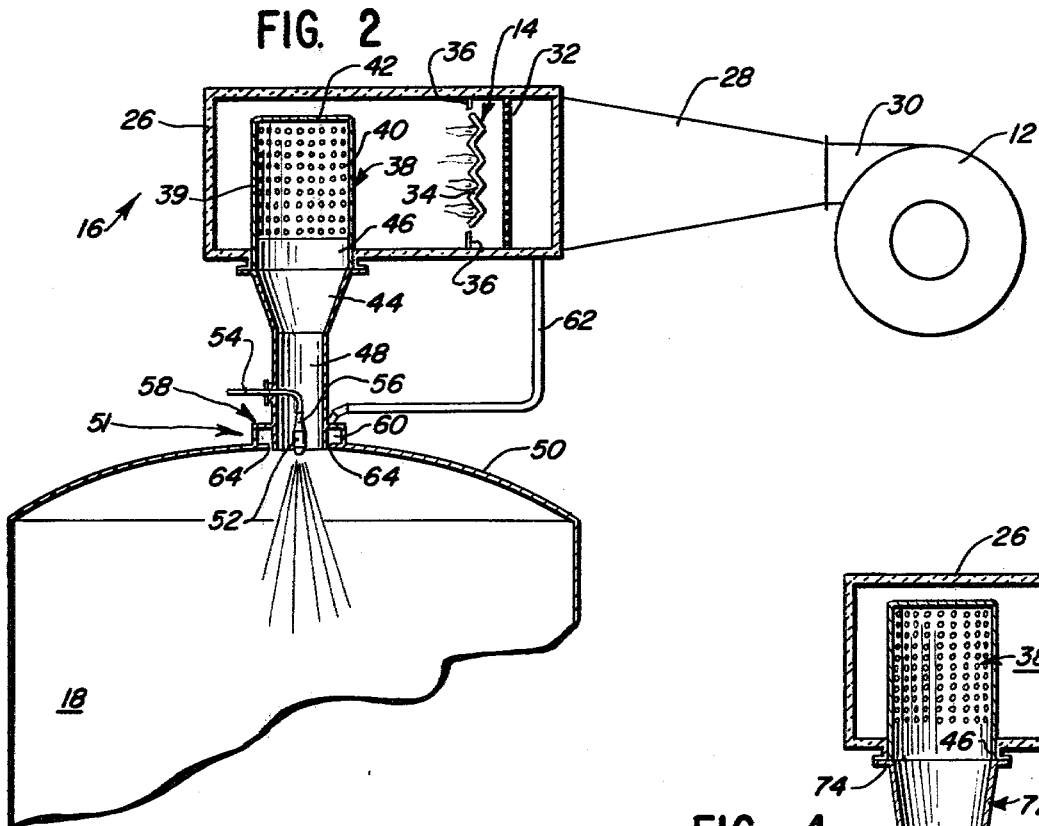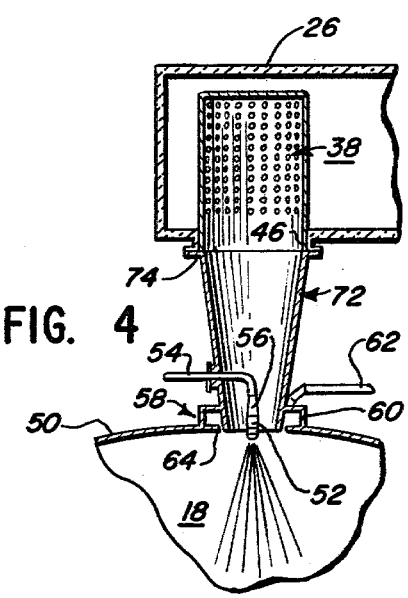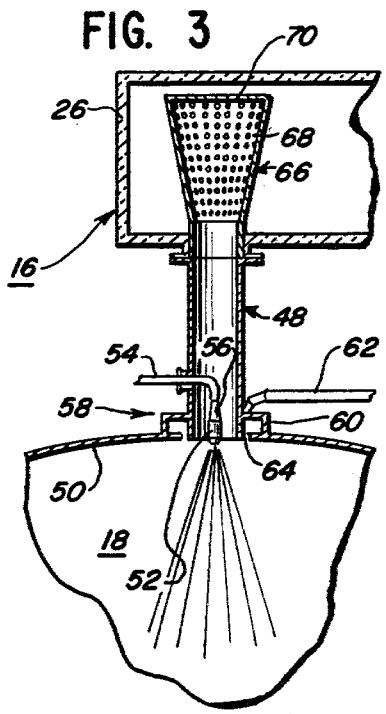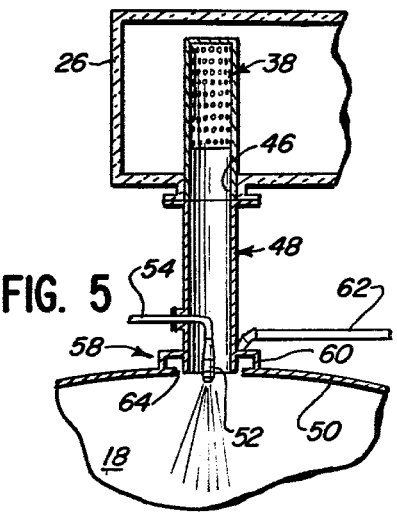

SPRAY DRYER

BACKGROUND OF THE INVENTION

The present invention relates to an improved, energy efficient spray dryer utilized to transform liquid feed solutions, through the almost instantaneous evaporation of the liquid in the feed solutions, to dry, finely divided powders, and more particularly, to such a spray dryer having a novel and unique air distribution system.

Spray dryers have been used for a number of years to produce powdered milk, powdered chalk, powder for cosmetics, and other similar powdered products from feed solutions consisting of solids dissolved, dispersed or suspended in water. Essentially, all spray dryers are comprised of: a source of a continuous flow of hot air; a drying chamber; an atomizing system; and a powder recovery system, with the air source typically including an air supply fan, an air heater and an air distribution system, and with the powder recovery system typically including a powder separation system and an exhaust air flow system. The function of the air source is to cause heated air, flowing continuously at a relatively high velocity, to be introduced into the drying chamber while the feed solution is being dispersed as small droplets into the air flow by the atomizing system.

Over the years, those working in the art have recognized that the structure and arrangement of the air source, and particularly that of the air distribution system, are of prime importance with respect to obtaining the goals of the efficient evaporation of feed solution in the drying chamber and of the production of a high quality powdered product. A number of different air distribution systems have been utilized to attempt to achieve these goals. In one prior known air distribution system, the drying air flows, along a generally horizontal path, from the air supply fan into a larger distribution chamber, and past an air heater. The heated drying air then continues to flow along the horizontal path until it is introduced into the drying chamber through a vertically disposed, open ended cylindrical distributor tube. A plurality of horizontally disposed woven wire screens are mounted in the distributor tube, between its ends, to attempt to make the air velocity more uniform. A cooling ring is mounted about the lower end of the distributor tube, i.e. the end of the tube adjacent to the upper end or roof of the drying chamber. A small portion of the relatively cool air, flowing from the air supply fan, is directed to flow through the cooling ring and to exit from the ring, through an annular air gap, to the exterior of the spray dryer. Another known prior art distribution system is similar to the foregoing system except that the upper, inlet end of the vertically disposed distributor tube is cut off at an angle, normally 45°, with respect to the longitudinal vertical axis of the tube and that the horizontally disposed woven sire screens are positioned adjacent to the lower end of the tube. These two prior systems are described more specifically hereafter. Still another known prior art distribution system is similar to the first, above described systems except that the upper, inlet end of the vertically disposed distributor tube is flared outwardly and that the horizontal disposed woven wire screens are positioned adjacent to the upper inlet end of the distributor tube. In yet another known prior art distributor system, heated air is introduced into the drying chamber through a generally uniform diameter conduit. A bank of relatively small diameter tubes are disposed in and across the conduit downstream from the air heater. A venturi is positioned between this bank of small tubes and the drying chamber so that the air flowing from the venturi is introduced directly into the drying chamber. The end of the conduit adjacent the upper end of the drying chamber is cooled by the circulation of water through a ring disposed about the lower end.

While the foregoing prior art distribution systems perform adequately, by contemporary standards, it has been found that practical limits exist as to the air velocity distribution and the temperature of the air that may be introduced into the drying chambers of the systems and that these limits reduce the efficiency of the prior spray dryers. In other words, while ideally the temperatures of air should be as high as the particular product can tolerate and the velocity of the air should be as even in distribution as the system will produce, the structure and arrangement of the air distribution systems impose limits on the maximum temperature and velocity distribution of the air flow that can be used during the actual operating of the prior spray dryers. We have analyzed these prior art distribution systems and in our opinion, the practical limitation of these prior systems is caused by the fact that the air flowing into the drying chamber does not have sufficiently uniform velocity and temperature profiles. More specifically, each droplet emerging from the atomizer system should be dried with air at a predetermined desired temperature. In these prior air distribution systems, it has been found that while the average temperature of the air may be at or near this desired temperature, there will be significant variations in the temperature of air, as measured across a plane transverse to the air flow. The droplets subjected to the lower temperature air will be too "wet" and will deposit on the lower parts of the drying chamber. The droplets subjected to the higher temperature air will be too "dry" and will give rise to an inferior product quality.

The effect of variations in the velocity profile is similar to that of the temperature profile since the rate of drying of the droplet particles is proportional to the amount or volume of air introduced onto each droplet particle. To avoid the problems caused by the nonuniform velocity and temperature profiles, it has been necessary to operate the prior spray dryers at lower, less efficient temperatures and velocities.

Another problem present in the prior air distribution systems is the formation of a fringe of burned powder at the drying chamber roof—distribution system interface. The introduction of air into the drying chamber causes eddy currents in the chamber, and these currents in turn cause some partially dried droplet-particles to migrate back up onto the roof of the chamber where they are "burned on" and form the fringe of burned powder. This fringe is detrimental to the operation of the dryer in that parts of the fringe continually fall off and contaminate the powdered product and in some cases, the fringe will ignite and cause extensive burning in the drying chamber.

It is a primary object of our present invention to provide an improved spray dryer which has a novel air distribution system capable of producing relatively even or uniform air velocity and temperature profiles and which thus may be operated satisfactorily at air velocities at or relatively near the maximum velocities obtainable in the spray dryer and at drying air temperatures at or relatively near the maximum optional drying temperature for the product being processed. It is a related object of our present invention to provide an improved spray dryer of the type described wherein the longstanding above described problem of fringe formation at the drying chamber roof-distribution system interface is significantly reduced if not completely prevented.

More specifically, the improved spray dryer of our present invention includes a novel air distribution system wherein tapered or sloped transition ducting is used to direct the air from the air supply fan to the air heater. This transition ducting allows the air to expand evenly over the whole area of the heater. A pre-profile plate is mounted immediately upstream of the heater and functions to level out differences in the velocity of the air coming from the air supply fan. In other words, the pre-profile plate helps to even out air velocity differences in the air entering the heater, resulting in a more even temperature distribution from the heater. A profile plate is used with the heater to prevent large quantities of unheated air from bypassing the heater. Despite the use of the pre-profile and profile plates, unacceptable variations may still exist in the air temperature and velocity profiles.

In order to overcome these variations, the heated air is then forced to flow through a diffuser that consists of a perforated plate or woven wire having a large number of small holes therein. As the heated air passes through the small holes in the diffuser, it is subjected to a pressure drop and is intimately mixed so that the velocity and temperature profiles of the air flowing downstream of the diffuser is much more uniform.

Downstream of the diffuser, the air flows through a compression device which may be a conical or similarity shaped piece of ducting and which functions to increase the velocity of the air, typically by a factor of three, and to even out any remaining temperature and velocity irregularities that remain in the temperature and velocity profiles although its greatest effect is in smoothing out velocity differences. The heated air next flows through a lower air distributor which is a straight piece of ducting or tubing and which functions to straighten out any small variations in the air velocity profile that may still exist and to project and direct the air flow, at the desired velocity, into the drying chamber. To minimize turbulence caused by the nozzle atomizer of the atomizing system, a tapered aerodynamically designed piece is placed on and over the nozzle to streamline the shape of the nozzle and to allow air to flow past the nozzle with the least amount of turbulence.

In one embodiment of present invention described herein, the diffuser and the compression device are not separate components although the modified combined diffuser-compression device functions, for all practical matters, the same as the separate diffuser and compression device. In another embodiment, however, the compression device and its function are omitted while in still another embodiment, the lower air distributor, and a substantial portion of its function is accomplished by a modified compression device.

The air distribution system of our present invention also includes an internal air gap cooling system which is utilized to prevent the formation of a burned powder fringe at and around the interface between the drying chamber roof and the adjacent lower end of lower air distributor. This cooling system includes a ring that surrounds the interface and that has a relatively small annular gap to allow cooling air to flow into the drying chamber so as to cool the tip of the lower air distributor and the surrounding area. The employment of this cooling system allows the improved spray dryer of our present invention to be operated at relatively high air temperatures, without the formation of the objectionable fringe, and thus increases the efficiency and practical capacity of the spray dryer.

These and other objects and advantages of the present invention will become apparent from the following description of the preferred embodiments of this invention, described in connection with the accompanying drawings.

BRIEF DESCRIPTION OF THE DRAWINGS

FIG. 1 is a diagrammatic view of the improved spray dryer of our present invention.

FIG. 2 is a partial, vertical sectional and diagrammatic view of the air distribution system of the spray dryer of FIG. 1 constructed in accordance with one embodiment of our invention.

FIG. 3 is a partial, vertical sectional view of a portion of the air distribution system of our present invention showing a second embodiment of our invention.

FIG. 4 is a view similar to FIG. 5 constructed in accordance with a third embodiment of our invention.

FIG. 5 is a view similar to FIGS. 5 and 6 showing a fourth embodiment of our invention.

FIG. 6 is a vertical sectional view of an air distribution system used with prior art spray dryers.

FIG. 7 is a vertical sectional view of another air distribution system used with prior art spray dryers.

FIG. 8 is a vertical sectional view of a portion of the drying chamber of a prior art spray dryer and showing the path of some partially dryed particles—droplets that causes the formation of a fringe.

Throughout the various figures of the drawings, the same numerals will be used to designate the same parts in the various spray dryers. Moreover, when the terms "right", "left", "right end", "left end", "upper" and "lower" are used herein, it is understood that these terms have reference to the structure shown in the drawings as it would appear to a person viewing the drawings.

DESCRIPTION OF THE PREFERRED EMBODIMENT

Referring now to FIG. 1, the improved spray dryer of our present invention is shown generally at 10. The spray dryer 10 includes: a centrifugal air supply fan 12; an air heater 14; a novel air distribution system 16; a drying chamber 18; an atomizing system 20; a separation system 22; and an exhaust air fan 24. Except as hereinafter noted, the air supply fan 12, the air heater 14, the drying chamber 18, the atomizing system 20, the separation system 22 and the exhaust air fan 24 are of a convention design and structure.

Moreover, the improved spray dryer 10 operates in a generally conventional manner although because of the employment of the novel air distribution system 16 hereinafter described, the spray dryer 10 may be operated much more efficiently and at a higher capacity than comparable competitive prior spray dryers. More specifically, the spray dryer 10 operates as follows: the air required for drying the liquid feed solution is introduced into the air distribution system 16 by the air supply fan 12. The air is heated to a predetermined, desired air temperature by means of the heater 14 which is disposed in the air distribution system 16. The heated air is then introduced into the drying chamber 18. The atomizing system 20 causes the liquid feed solution to be dispersed in small droplets in the heated air flow as the air flow enters the the drying chamber 18. The water present in the droplets is removed, by almost instantaneous evaporation, in the drying chamber 18, thus transforming the droplets into dry powdered particles. These dry particles are then conveyed by the air flow to the separation system 22. In the separation system 22, the dry particles are collected, as for example in a cyclone or bag filter device. The drying air is removed from the spray dryer 20 by the exhaust air fan 24.

As noted above, the improved spray dryer 10 incorporates a novel air distribution system 16 which is used to introduce heated air into the drying chamber 18. The system 16 provides the spray dryer 10 with an important commercial advantage in that it permits air to be introduced in the dry chamber 18, during actual operation, at significantly higher temperatures and with more even velocities than heretofore permitted. These relatively higher operational temperatures and velocities are achievable because the design and structure of the components of the system 16 cause the air flowing into the drying chamber 18 to have much more even or uniform temperature and velocity profiles (as measured in a plane transverse to the direction of the air flow) than those obtainable, at the same temperatures and velocities, in prior spray dryers. Even or uniform temperature and velocity profiles are important because if these profiles are not uniform, the droplets will dry unevenly in the drying chamber 18. More specifically, it is extremely important that all the droplets are subject to the same preselected, desired temperature, as determined by the product being processed, and that the difference or spread of the temperatures across the temperature profile be kept to a minimum. The problem with an uneven temperature profile is that some of the particles will be subject to temperatures less than the desired temperature. These particles will thus be "too wet" and will tend to deposit on the lower parts of the drying chamber 18. Other particles, subjected to higher temperatures than the desired temperature, will be "too dry" and will give rise to an inferior product quality. If an even or uniform temperature profile can be maintained, all the droplets will dry evenly, and the drying chamber 18 will remain clean and a high quality product will be produced.

Since the rate of drying of droplets is proportional to the amount of air introduced onto each droplet, the effect of variations in the velocity profile is similar to that of variation in the temperature profile. Thus, it is extremely important to maintain an even or uniform velocity profile across the air flow entering the drying chamber 18. If the velocity profile includes too great of a spread or variation in velocities, some of the droplets will be subjected to a velocity lower than that desired and will dry slowly. These slowly drying droplets will then be "too wet" and will tend to stick to the drying chamber 18. Similarly, some of the droplets will be subjected to an air velocity which is greater than that desired and will become "too dry". These "too dry" droplets result in an inferior quality product being produced.

Referring now to FIGS. 1 and 2, one embodiment of the novel air distribution system 16 is illustrated and includes a distribution chamber 26. A sloped or tapered transition duct 28 extends between and interconnects the right hand end of the chamber 26 and the exhaust 30 of the air supply fan 12. This duct 28 allows the air from the fan 12 to expand evenly over the whole cross-sectional area of the chamber 26.

A pre-profile plate 32 is mounted in the chamber 26 adjacent to its right hand end. This plate 32 extends completely across the interior of the chamber 26 and functions to level out differences in air velocity of the air flowing from the fan 12. In this regard, it is well known that there are differences in the velocity of the discharge of centrifugal fans, such as fan 12, and the plate 32 is utilized with this in mind. The plate 32 is perforated with a large number of relatively small holes, and alternatively, the plate 32 could be made from a woven wire type material. The plate 32 is designed to take a pressure drop of between 0.5–7.5 wg, depending on the velocity irregularities present in the air coming from the fan 12.

The conventional air heater 14 is mounted in the chamber 26 immediately downstream of the plate 32. The air heater 14 extends substantially transversely across the interior of the chamber 26, includes a plurality of gas burner elements 34, and is, as noted above, of conventional design and construction. Due to the presence of the pre-profile plate 32, a more even air temperature distribution may be achieved through the air heater 14 than in heaters used in prior spray dryers.

A profile plate 36 is mounted in the chamber 26 about the heater 14 and is used to prevent large quantities of unheated air from bypassing the heater 14. In this regard, the gap or spacing between the profile plate 36 and the heater 14 is calculated to allow the unheated air to flow through the gap at a rate of 2500–3500 feet per minute and preferably 2800–3200 feet per minute. The air flows in the chamber 26 along a defined, generally horizontal path from the right hand end to the left hand end of the chamber, and despite the use of the pre-profile and profile plates 32 and 36, respectively, there are still unacceptable variations in the temperature and velocity of the air flowing in the chamber 26 downstream of the heater 14.

A diffuser 38 is mounted in the left hand end of the chamber 26. The diffuser 38 is made from a metal plate 39 which is formed into a cylindrical shape. The plate 39 is perforated so as to have a plurality of regularly spaced, relatively small holes 40 therein. For example, in a diffuser that we have made and tested, the plate 39 was originally rectangular in shape, having dimensions of 36 inches by 96 inches, was made from 304 stainless steel and included a plurality of 1/16 inch diameter holes 40 on ⅛ inch staggered pitch so as to provide the plate with approximately 22% open area. This plate was formed into a right circular cylinder having an inside diameter of approximately 30 inches. However, the plate 39 could also be made from a woven wire material and as noted hereinafter, can assume other shapes. The upper end of the diffuser 38 is closed by a solid plate 42. Heated drying air from the heat 14 is forced to flow through the small holes 40 and into the interior of the diffuser 38. The flow through the holes 40 causes a pressure drop of 0.5 to 7 inches wg, and in addition, results in the intimate mixing of the air so that a greatly improved temperature and velocity distribution is present in the lower downstream end of the diffuser 38.

A compression device 44 is mounted on the lower, open end of the diffuser 38 so that the interior of the device 44 is in communication with the interior of the diffuser. The compression device 44 is made from a conical or similarly shaped piece of ducting, with its larger cross-sectional area end being adjacent to the end 46 of the diffuser 38. The compression device 44 functions to even out remaining temperature and velocity irregularities which remain in the air flow after the air passes through the diffuser, although its greatest effect is in soothing out velocity differences. In view of the reduction in the cross-sectional areas of the device 44 between its upper and lower ends, the velocity of the air flowing through the device 44 is significantly increasing. Typically the velocity would be increased by a factor of three, as for example, from 5000 feet per minute at the upper end of the device 44 to 15,000 feet per minute at its lower end.

A lower air distributor 48 is mounted on the lower end of the compression device 44 so as to permit air to flow from the device 44 into and through the distributor 48. This air distributor 48 is made from a relatively straight piece of conduit or tubing, with its length being from 0.25–10 times its diameter. The lower air distributor 48 functions to straighten out any remaining, small irregularities in the air velocity profile which exists and to project and introduce heated air, at the desired velocity, into the drying chamber 18. Typically, the velocity of the air entering the drying chamber 18 will be in the range of 7000–25,000 feet per minute, depending on the product being dryed.

The lower end of the distributor 48 is secured to the roof 50 of the drying chamber 18 so that an interface 51 is defined between this lower end and the roof 50. The compression device 44 and the lower air distributor 48, together with the interior of the diffuser 38, define a second, relatively straight, air flow path in the system 16, and thus the second defined air flow path is substantially perpendicular to the first defined air flow path in the chamber 26.

The atomizing system 20 includes a conventional nozzle 52 which is used to disperse small droplets of the feed solution into the air flowing into the drying chamber 18. A relatively small diameter tube 54 interconnects the nozzle 52 with the remaining portion of the atomizing system 20 and extends through the side wall of the lower air distributor 48 so as to support the nozzle 52, in the distributor 48, at a central point adjacent to the interface 51. The nozzle 52 tends to cause a slight turbulence in the substantially laminer air flow passing through the lower air distributor 48. To minimize this turbulence, an aerodynamically designed, tapered piece of material 56 is placed over the nozzle 52 to streamline the nozzle's shape.

A novel internal air gap cooling system 58 is fabricated about the interface 51 between the roof 50 of the drying chamber 18 and the lower end of the air distributor 48. This cooling system 58 includes a generally tubular ring 60 which is mounted on the exterior surface of the roof 50 and adjacent to and about the exterior surface of the distributor 48. As best shown in FIG. 2, a relatively small diameter tube 62 extends between the ring 60 and the interior of the chamber 26, upstream of the pre-profile plate 32. This tube 62 is used to convey a small quantity of relatively cooler air to the ring 60, for example, in the range of 0.25–10 percent of the total air flow, depending on the temperature of the heated air. An annular gap 64 is formed in the ring 60 so as to provide an opening between the interior of the ring 60 and the interior of the drying chamber 18. This gap 64 permits the cooler air in the ring 60 to flow out around the lower end of the distributor 48 so as to cool this lower end and the surrounding area of the roof 50. The employment of the cooling system 58 provides the spray dryer 10 with the commercially important advantage of permitting the spray dryer 10 to operate at relatively high air temperatures, without danger of any burned powder fringe forming a the interface 51.

A second embodiment of the novel air distribution system 16 of our present invention is illustrated in FIG. 3 and is similar, in structure and mode of operation, to the system 16 described in connection with FIGS. 1 and 2 except as hereinafter noted. In this embodiment of our air distribution system, the diffuser 38 and the compression device 44 are combined as a single, integral unit rather than being two separate units. More specifically, a diffuser-compression device 66 is mounted in the chamber 26 downstream from the heater 14. Like the diffuser 38, the combined diffuser-compression device 66 is made from a plate perforated with a plurality of relatively small holes 68 and a closed upper end 70. The lower, open end of the diffuser-compression device 66 is mounted on and communicates with the upper end with the lower air distributor 48. The diffuser-compressor device 66 has a generally conical shape, with its upper end having the larger cross-sectional area. The lower end of the diffuser-compressor device 66 has generally the same diameter as that of the air distributor 48. The diffuser-compressor device 66 functions generally in the same manner as both the diffuser 38 and the compressor device 44 function in combination.

A third embodiment of the air distribution system 16 of our present invention is illustrated in FIG. 4. The air distribution 16 shown in FIG. 4 is similar, in structure and mode of operation, to the system 16 described in connection with FIGS. 1 and 2, except that in this embodiment, a single compression device-lower air distributor 72 is used in place of the separate compression device 44 and lower air distributor 48 in the FIGS. 1 and 2 embodiment. The compressor device-air distributor 72 is made from a generally conical piece of tubing, with its upper, larger cross-sectional area end 74 being secured to and in communication with the lower end 46 of the diffuser 38. The combined compressor device-air distributor 72 functions in a manner similar to the compressor device 44 and the air distributor 48.

A fourth embodiment of the air distribution system 16 of our present invention is shown in FIG. 5. The air distribution system 16 shown in FIG. 5 is similar, in structure and mode of operation, to the system 16 described in connection with FIGS. 1 and 2, except that in this embodiment, an air compression device, such as the device 44, is omitted and the diameter of the diffuser 38 is reduced so that it is now the same as the diameter of the lower air distributor 48. While this embodiment does not function as effectively as the FIGS. 1 and 2 embodiment of the air distribution system 16, this embodiment still does provide a marked improvement in the uniformity of the temperature and velocity profiles of the air flowing into the drying chamber 18, as compared to the air distribution systems utilized in the prior spray dryers.

Figure 7:
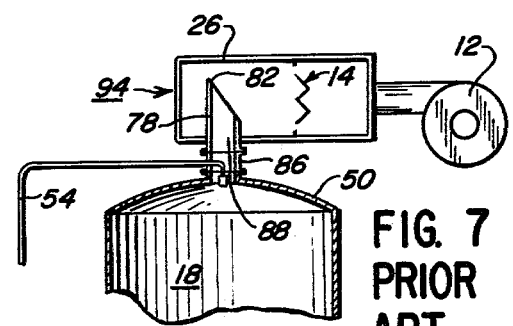
Figure 6:
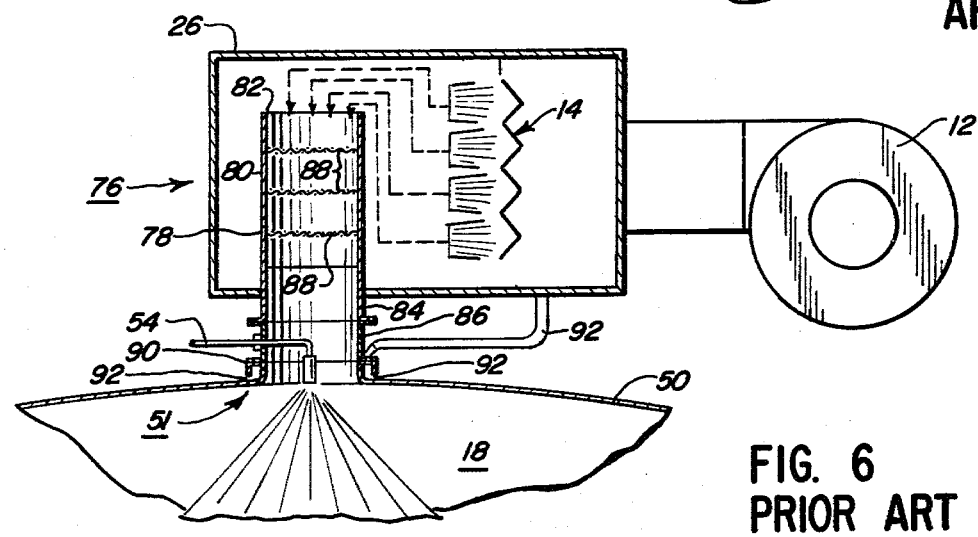

Several previously used air distribution systems were described hereinabove, and the two such systems which, in our opinion, appear to be most pertinent are illustrated in FIGS. 6 and 7. The prior system 76 illustrated in FIG. 6 includes an air distribution chamber 26 which is connected with an air supply fan 12. The chamber 26 includes a conventional heater 14. A generally vertically disposed, relatively large diameter tube 78 is mounted in the chamber 26 downstream of the heater 14. The tube 78 has a solid side wall 80 and an open, upper end 82. The lower end of the tube 84 is connected with the interior of the drying chamber 18 by a second tube 86 which has the same diameter as the tube 78. Three woven wire screens 88 are disposed in and extend transversely across the tube 78, with the planes of these screens being transverse to the longitudinal axis of the tube 78 and also to the path of the air flowing through the tubes 78 and 86. The interface 51 between the lower end of the tube 86 and the roof 50 of the drying chamber 18 is cooled by a cooling ring 90. A relatively small diameter tubing 92 interconnects the ring 90 with the chamber 26, upstream from the heater 14, so that relatively cooler air from the fan 12 can pass through the cooling ring 90. A gap 92 is defined between the cooling ring 90 and the exterior surface of the roof 50 so as to permit the escape of the cooler air from the ring 90 to the exterior of the air distribution system and of the drying chamber 18.

Another air distribution system 94 employed in prior spray dryers is generally illustrated in FIG. 7. The air distribution system 94 is generally similar to the system 76, described in connection with FIG. 6, except that the upper end 82 of the tube 78 is cut off at an angle of generally 45°. This cut off, upper end 82 "faces" the heater 14. Another difference between the systems 76 and 94 is that in the latter, the woven wire screens 88 are disposed in the second tube 86 rather than in the tube 78. As discussed hereinabove, still another previously used air distribution system was similar to the systems 76 and 94 except that the upper end 82 of the tube 78 includes an upwardly, outwardly conically flared portion instead of being cut straight across, as in system 76 or being cut at an angle as in system 94.

Figure 8:
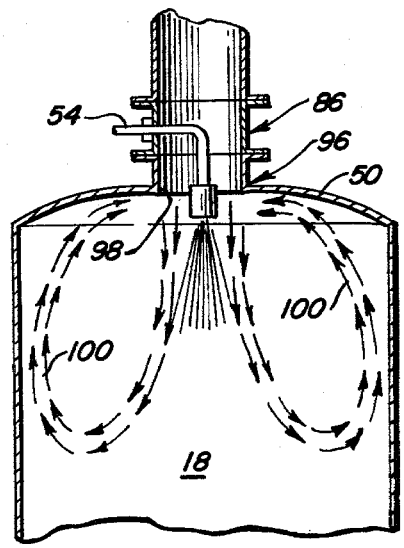

FIG. 8 illustrates an interface 96 typically found in prior spray dryers. More specifically, the interface 96 is defined between the lower end 98 of the second tube 86 and the roof 50 of the drying chamber 18. Normal operation of the prior spray dryers results in the creation of unwanted eddy currents, indicated generally at 100, in addition to the desired conical spray pattern. These eddy currents 100 tend to carry partially dried droplets-particles upwardly towards the roof 50 of the chamber 18. Some of these droplets-particles stick to the roof 50 about the lower end 98 of the tube 86 whereupon, because of the heat of the air entering the drying chamber 18, these droplets-particles form a fringe or ridge of burned powdered particles around the interface 96. As noted above, the formation of such a fringe has a serious, detrimental effect on the operation of the prior spray dryers in that parts of this burned fringe continually fall off and contaminate the rest of the product in the lower portion of the drying chamber 18. Moreover, in some cases, the fringe actually ignites and there is extensive burning in the chamber 18.

In summary, the improved spray dryer of our present invention permits the use, during actual production runs, of relatively much greater air velocities and air temperatures than heretofore possible in comparable prior spray dryers, and this significantly improves the efficiency and capacity of the improved spray dryer, as compared to the prior comparably sized spray dryers such as illustrated in FIGS. 6 and 7 and described hereinabove. The improved spray dryer of our invention is able to employ these greater air velocities and temperatures because the novel air distribution system employed in our spray dryer permits the air flowing into the drying chamber to have relatively even or uniform velocity and temperature profiles. In addition, the novel air distribution system of our improved spray dryer also includes an internal air gap cooling system which so cools the interface between the air distribution system 16 and the drying chamber 18 that our spray dryer may be operated at very high inlet air temperatures without any detrimentional fringe of burned powder being formed at the interface. This, we believe, represents, in and of itself, a significant advance in spray drying technology.

Thus, since our invention disclosed herein may be embodied in other specific forms without departing from the spirit or central characteristics thereof, the preferred embodiments described herein are therefore to be considered in all respects as illustrative and not restrictive, the scope of our invention being indicated by the appended claims, rather than by the foregoing descriptions, and all changes which come within the meaning and range of equivalency of the claims are therefore intended to be embraced therein.

We claim:

1. An improved spray dryer for transforming a liquid feed solution into a dry powder comprising:

means for supplying a continuous flow of the air required for drying;

means for heating the flow of drying air to a desired, relatively high temperature;

a drying chamber for receiving dispersed, small droplets of the feed solution and wherein the droplets are transformed into dry particles;

an air distribution system which is connected with the air supply means and which directs the flow of drying air into the drying chamber so that the air flowing into the drying chamber has substantially uniform temperature and velocity profiles;

an atomizing system which forms and introduces the dispersed droplets of feed solution into the flow of drying air as the drying air is introduced into the drying chamber;

a powder recovery system which collects the particles dried in the drying chamber and which removes the air from the spray dryer after it has passed through the drying chamber;

the air distribution system including a first distribution chamber having a first air flow path defined therein between a first point and a second point; means for connecting the air supply means with the first chamber adjacent to the first point so that air may flow in the first chamber along the first defined air flow path from the first point to the second point; the air heating means being disposed in the first chamber in the first defined air flow path and between the first and second points; a diffuser member having a first and second end portions, with at least the first end portion being disposed in the first chamber adjacent to the second point of the first defined air flow path, the first end portion of the diffuser including a wall having a plurality of relatively small holes therein which permit heated air flowing along the first defined air path to flow through the small holes and into the interior of the diffuser member, with the plane of the wall being disposed at an angle with respect to the first defined air flow path; and means defining a second air flow path and extending between the interior of the diffuser member and the interior of the drying chamber, with the second defined air flow path being substantially perpendicular to the first defined air flow path.

2. The improved spray dryer described in claim 1 wherein the second defined air flow path includes means for evening out any remaining irregularities in the temperature and velocity profiles of the air flowing downstream of the diffuser member and for increasing the velocity of the air flowing along said second defined air flow path.

3. The improved spray dryer described in claim 2 wherein the last mentioned means is disposed adjacent to the second end portion of the diffuser and includes a conical shaped member, with the larger crossectional area end of this conical shaped member being adjacent to the second portion of the diffuser member.

4. The improved spray dryer described in claim 2 wherein the last mentioned means constitutes a portion of the diffuser member.

5. The improved spray dryer described in claim 1 wherein the upper end of the first end portion of the diffuser member is closed.

6. The improved spray dryer described in claim 3 wherein the means defining the second defined air flow path includes a lower air distributor which is disposed adjacent to the dryer chamber, which is a relatively straight piece of tubing whose length should be between 0.25–10 times its diameter and which serves to straighten out any remaining small irregularities in the air velocity profile that may exist in the air flowing along the second defined air flow path and to project the air flow into the interior of the drying chamber at a velocity in the range of 7,000–25,000 feet per minute, depending on the product being dry.

7. The improved spray dryer described in claim 1 wherein the means defining the second defined air flow path includes a lower air distributor which is disposed adjacent to the dryer chamber, which is a relatively straight piece of tubing whose length should be between 0.25–10 times its diameter and which serves to straighten out any remaining small irregularities in the air velocity profile that may exist in the air flowing along the second defined air flow path and to project the air flow into the interior of the drying chamber.

8. The improved spray dryer described in claim 1 wherein the air distribution system includes a plate having a plurality of relatively small holes therein, the plate being mounted in the first chamber in the first defined air flow path between the first point and the air heating means.

9. An improved spray dryer for transforming a liquid feed solution into a dry powder comprising:

means for supplying a continuous flow of the air required for drying;

means for heating the flow of drying air to a desired, relatively high temperature;

a drying chamber for receiving dispersed, small droplets of the feed solution and wherein the droplets are transformed into dry particles, the drying chamber including a roof;

an air distribution system which is connected with the air supply means and which directs the flow of drying air into the drying chamber, with an interface being defined between that lower portion of the air distribution system in air flow communication with the drying chamber and the roof of the drying chamber;

an atomizing system which forms and introduces the dispersed droplets of feed solution into the flow of drying air as the drying air is introduced into the drying chamber;

a powder recovery system which collects the particles dried in the drying chamber and which removed the air from the spray dryer after it has passed through the drying chamber; and the air distribution system including a cooling ring disposed about the interface; means for connecting the cooling ring with a source of relatively cooler air under pressure; and means for permitting the relatively cooler air in the cooling ring to flow into the interior of the drying chamber adjacent to the interface to prevent the formation of a fringe of burnt powder at the interface.

10. The improved spray dryer as described in claim 8 wherein the cooling ring is mounted adjacent to the exterior surface of the roof of the drying chamber and to the interface; and wherein a gap is defined in and between the cooling ring and the structure defining the interface through which relatively cooler air from the cooling ring may flow into the interior of the drying chamber.

11. The improved spray dryer described in claim 10 wherein the cooling ring extends completely about the interface; and wherein the gap is substantially annular.

12. The improved spray dryer described in claim 9 wherein the quantity of relatively cooler air flowing into and through the cooling ring is small relative to the quantity of drying air flowing into the drying chamber.

* * * * *